United States Patent [19]

Moriguchi et al.

[11] Patent Number: 4,651,167

[45] Date of Patent: Mar. 17, 1987

[54] PRINTING METHOD

[75] Inventors: Haruhiko Moriguchi; Toshiharu Inui; Takashi Ohmori; Yoshiki Kikuchi, all of Kanagawa, Japan

[73] Assignee: Fuji Xerox Co., Ltd., Tokyo, Japan

[21] Appl. No.: 779,645

[22] Filed: Sep. 24, 1985

[30] Foreign Application Priority Data

Sep. 25, 1984 [JP] Japan ............................... 59-198733

[51] Int. Cl.⁴ ............................................ G01D 15/10

[52] U.S. Cl. ............................... 346/76 PH; 400/120; 346/106

[58] Field of Search .................. 346/105, 106, 76 PH, 346/76 R; 250/318; 400/120; 214/216 PH; 101/470

[56] References Cited

U.S. PATENT DOCUMENTS

| | | | |
|---|---|---|---|
| 4,157,412 | 1/1979 | Deneau | 346/105 |
| 4,388,628 | 6/1983 | Moriguchi et al. | 346/76 PH |
| 4,527,171 | 7/1985 | Takanashi et al. | 346/76 PH |

*Primary Examiner*—Arthur G. Evans
*Attorney, Agent, or Firm*—Finnegan, Henderson, Farabow, Garrett & Dunner

[57] ABSTRACT

A printing method is shown in which printing quality is improved when superimposed thermal-transfer recording is performed. According to the present invention, at least one of a plurality of thermal-transfer media is made of a material of different thermal characteristics from the remaining media. Different thermal-transfer media thermal characteristics are obtained by changing the thickness, melting point or viscosity of the thermal-transfer ink on the thermal transfer media, or by changing the thickness, quality of material or density of the base material of the thermal-transfer media.

7 Claims, 12 Drawing Figures

PRINTING METHOD

BACKGROUND OF THE INVENTION

1. Field of the Invention

The present invention relates to a printing method for a thermal-transfer recording system using two or more kinds of thermal-transfer ink.

2. Description of Related Art

In a printing device using a thermal-transfer recording system, a clear printed matter can be obtained by selectively transferring ink, which is fluidized or sublimated by heating, onto an ordinary paper. When a plurality of thermal-transfer media is used with this kind of printing device, a color recording or gradation recording is obtainable by layering ink on the same printing paper. That is, if thermal-transfer media are made with different color inks, color recording can be obtained by using these different colors as disclosed, for example, in U. S. Pat. No. 4,388,628. On the other hand, if a plurality of inks of the same color but of different densities are prepared, gradation expression can be obtained.

FIGS. 11 and 12 are diagrams depicting the printing method and the printing device described above. A printing device shown in FIG. 11 uses roll paper on which three kinds of thermal-transfer media are formed. That is, roll paper 1 is formed by successively connecting thermal-transfer media sections of a cyanic color (C), a magenta color (M), and a yellow color (Y). Different kinds of ink are applied individually in sections of predetermined width on a single base layer (substrate). Printing paper 2 is urged against thermal head 4 by pressing roller 3 thereby bringing the printing paper 2 into contact with the roll paper 1. Under the condition described above, the thermal head 4 is selectively driven for every line, so that fluidized or sublimated ink is transferred onto the printing paper 2. During the printing operation, when roll paper 1 is subscanned in the direction of the arrow in FIG. 11, the printing paper 2 is advanced in the same direction. Upon completion of printing with one color, the printing paper 2 is rewound to the initial printing start position and a second color is printed as described above. By repeating this step, three colors are printed on the recording paper 2.

On the other hand, FIG. 12 shows a printing device in which a printing paper 7 is set on a platen 6 and thermal-transfer recording media 8-1 through 8-4 are passed successively through a portion between a thermal head 4 and the rotating platen 6. In this case, one color ink or one ink printing density is applied to the base layer by each of the thermal-transfer media 8-1 to 8-4.

With these conventional printing methods, thermal-transfer recording media used for each printing device have the same thermal characteristics. Conventionally, a thermal-transfer recording media must have a thermal characteristic such that an equal quantity of thermal-transfer ink is adhered or transferred onto a not-yet printed white paper when a thermal pulse of predetermined energy is generated from a thermal head.

In the printing method using a thermal-transfer recording system where a plurality of thermal-transfer media are used, frequently a plurality of kinds of ink are layered on a printing paper. Thermal-transfer ink is solidified such that it is adhered to, or partly permeated into, the printing paper used as a record maintaining body or it is adhered to the ink already transferred onto the paper. However, the state of adhesion, the degree of permeation, and even the quantity of transfer may vary depending on the state of the surface of the record maintaining body. Therefore, the state of transferred ink conventionally has varied between portions where the surface of the printing paper was previously uncovered and where it was covered such that color shades or darkness were irregular, or picture quality deteriorated as by disturbance in resolution or the like.

SUMMARY OF THE INVENTION

An object of the present invention is to eliminate the disadvantages of conventional printing methods.

Another object of the present invention is to provide a printing method in which printing quality is improved when superimposed printing is performed by using a plurality of thermal-transfer recording media.

In order to achieve the above objects, the present invention provides a method for obtaining stable, high quality thermal-transferred recordings even in the case where ink layers are superimposed. The method includes the steps of preparing thermal-transfer recording media which are different from each other in color or printing density where at least one of the media has thermal characteristics different from another of the media. Printing operations are then performed by using the prepared thermal-transfer recording media successively on the same printing paper. The method is further embodied in the preparation of thermal-transfer recording media of different thermal charactreristics by applying ink layers of different thicknesses to the thermal-transfer recording media. The method is otherwise embodied in the application of ink layers of different melting points or different viscosities, or in the use of base materials in the thermal-transfer recording media of different thicknesses, densities, or material qualities.

Other features and advantages of the invention will be apparent from the following description taken in conjunction with the accompanying drawings.

DESCRIPTION OF PREFERRED EMBODIMENTS

Figure 1:
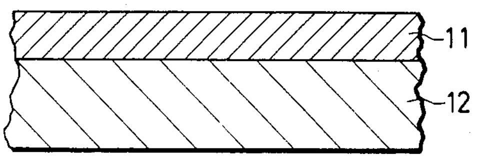
FIG. 1 is an explanatory diagram showing a cross section of a thermal-transfer recording media.

Referring to the drawings, preferred embodiments of the present invention will be described hereinafter.

Figure 2:
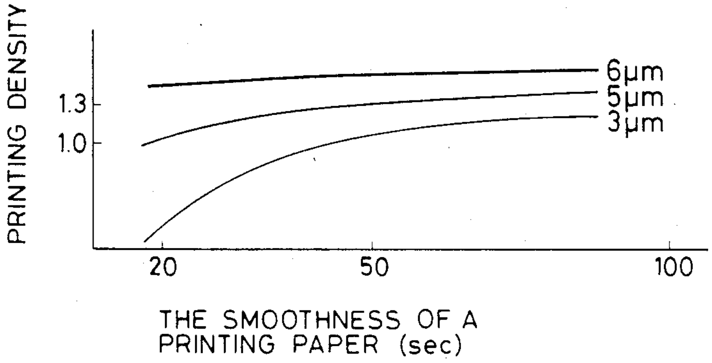
FIG. 2 is a graph showing the relationship between the smoothness of printing paper and printing density in the first embodiment of the present invention.

In the first embodiment, a printing method in which the thickness of a thermal-transfer ink layer is changed will be explained. The relationship between smoothness of a printing paper and printing density is shown in FIG. 2 in which the layer thickness of the thermal-transfer ink is varied in three stages. It is clear that the printing density is much effected by the surface condition of the printing paper if the ink layer is thin, but with a thicker ink layer, the printing density becomes more stable. Likewise, with a thicker ink layer, the transmittance of color is improved and the reproducibility of color is improved in cases where a plurality of ink layers are put on one another. Therefore, in the first embodiment, the ink layer of a thermal-transfer recording medium is selected to be thicker with succeeding transfers. The color and thickness of ink to be transferred is shown in the following Table 1 for succeeding transfers, for example, when four colors are printed.

TABLE 1

| Order of Transfer | Ink Color | Thickness (μm) |
|---|---|---|
| 1 | Yellow | 2 |
| 2 | Magenta | 3 |
| 3 | Cyanic | 3.5 |
| 4 | Black | 3.5 |

Figure 3:
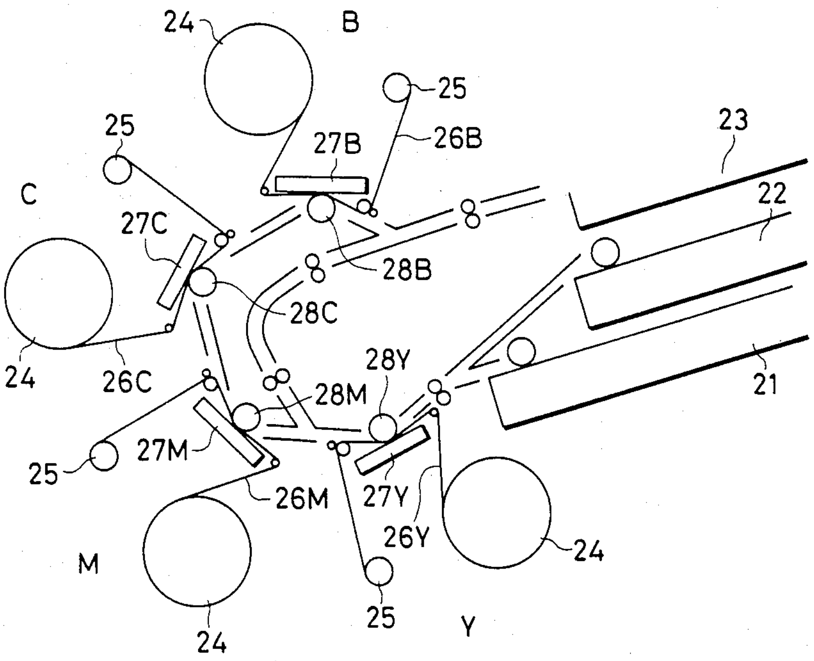
FIG. 3 is a schematic constitutional diagram showing a printing device in which the method of the first embodiment is used.

FIG. 3 shows the main portion of a printing device using the printing method of this embodiment. In this device, yellow (Y), magenta (M), cyanic (C) and black (B) color printing portions are disposed in this order along a conveying path for color recording on paper fed from either a large or a small paper feed tray 21, 22, respectively, and discharged into a paper discharge tray 23. A feed roller 24 and a take-up roller 25 are provided at each of the printing portions Y, M, C and B. An ink donor film 26Y as a thermal-transfer medium on which yellow ink has been applied is fed out from the feed roller 24, passed between a thermal head 27Y and a back roller 28Y, and successively taken up by the take-up roller 25. Similar apparatus is used in the other printing portions M, C and B.

Figure 4:
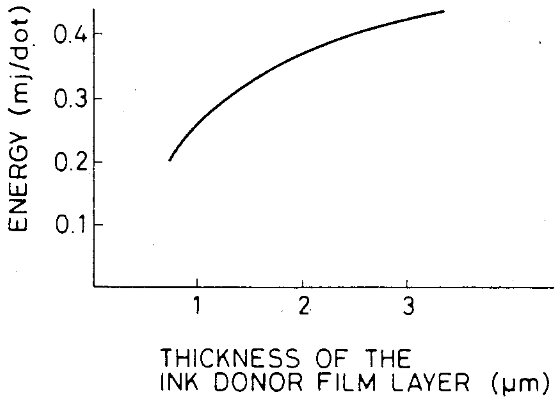
FIG. 4 is a graph for obtaining the proper value of energy to be applied to each thermal head for the method disclosed in the first embodiment.

FIG. 1 shows a cross section of an ink donor film layer 11 representative of each of ink donor films 26Y, 26M, 26C and 26B. Energy is applied to each of the thermal heads 27Y, 27M, 27C and 27B in accordance with the thickness of the ink layer. The relationship between the thickness of an ink layer and printing energy required per dot is shown in FIG. 4. The energy applied depends on the composition of ink, the temperature of the environment, the temperature of the thermal head substrate, etc. In this device, the pressure setting between the thermal heads 26Y–26B and back rollers 28Y–28B as well as the mechanical settings of the other parts are set in accordance with the three ink donor film thicknesses related in accordance with the method of the present invention.

Figure 5:
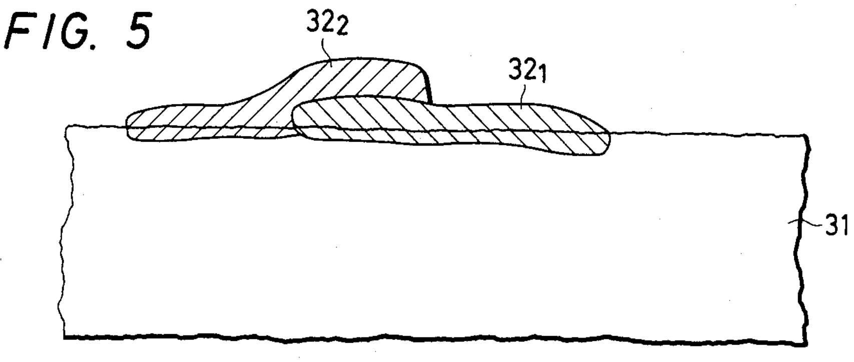
FIG. 5 is a diagram for explaining the adhesion of ink in the second embodiment.
Figure 6:
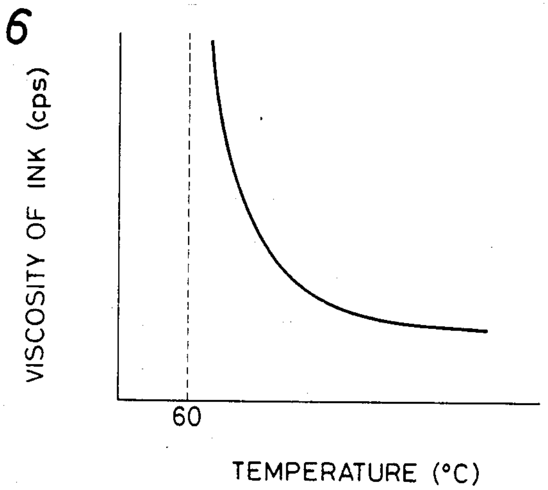
FIG. 6 is a graph showing the changes in viscosity of ink with temperature.

In a second embodiment of the printing method, the melting point or the sublimating point of the thermal-transfer ink is varied. FIG. 5 shows the state where a first thermal-transfer ink 32$_1$ and a second thermal-transfer ink 32$_2$ have been successively transferred onto a printing paper 31. Being transferred first, the first thermal-transfer ink 32$_1$ permeates into the fibers of the printing paper 31 over the entire printed area before cooling or solidifying. In this situation, the adhesive or fixing property is excellent. As with the first ink 32$_1$, strong adhesion is obtained for second ink 32$_2$ in the portion where the second thermal-transfer ink 32$_2$ is directly applied to the printing paper 31, that is, in regions not printed with ink 32$_1$. Where the second thermal-transfer ink 32$_2$ is superimposed on the first thermal-transfer ink 32$_1$, the second thermal-transfer ink 32$_2$ is applied onto an ink layer which has already been cooled. The second thermal-transfer ink 32$_2$ radiates heat into the cooled first thermal-transfer ink 32$_1$ so that the viscosity of the second ink, 32$_2$ becomes higher as shown in FIG. 6. Where inks having little or no difference in melting points are superimposed there is a problem that the adhesion of the second thermal-transfer ink is poor making the picture quality unstable.

In the second embodiment in which three kinds of thermal-transfer recording media are used for multi-color recording, the differences between the melting points of the respective thermal-transfer inks 32$_1$ through 32$_3$ are adjusted as shown in the following Table 2. This is accomplished by using different binding agents, by varying their composition, or by varying the compounding ratio in the respective thermal-transfer inks 32$_1$ through 32$_3$.

TABLE 2

| | |
|---|---|
| Ink 32$_1$ | 63° C. |
| Ink 32$_2$ | 67° C. |
| Ink 32$_3$ | 80° C. |

The melting point of each successively applied thermal-transfer ink is made higher to make it possible to set the applied printing energy gradually higher so that the surface of a lower ink layer is melted during adhering of subsequently applied inks. Thus, strong adhesion can be obtained when the adhered portions of the ink layers mixed during melting are solidified.

In a third embodiment, the thermal-transfer ink of the respective thermal-transfer recording media are made with different viscosity versus temperature relationships.

Figure 7:
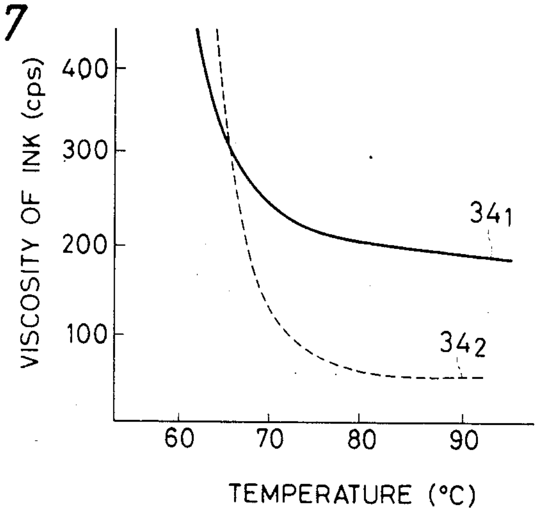
FIG. 7 is a graph showing the characteristics of two kinds of ink used in the third embodiment.

The viscosity of the second-to-be-transferred thermal-transfer ink should be relatively low so as to make stronger the adhesion between ink layers. In the third embodiment, adhesion is ensured by using thermal-transfer ink with a different viscosity-temperature relationship or "characteristic." The respective characteristics of the thermal-transfer ink applied to two kinds of thermal transfer media are shown in FIG. 7 in which a first ink 34$_1$ is transferred first and a second ink 34$_2$ is transferred next. The viscosity of the second ink 34$_2$ is considerably lower than that of the first ink 34$_1$ at the temperature at which transfer is performed. Therefore the adhesive state is good even when transfer is performed by superimposing one ink layer on the other.

Figure 8:
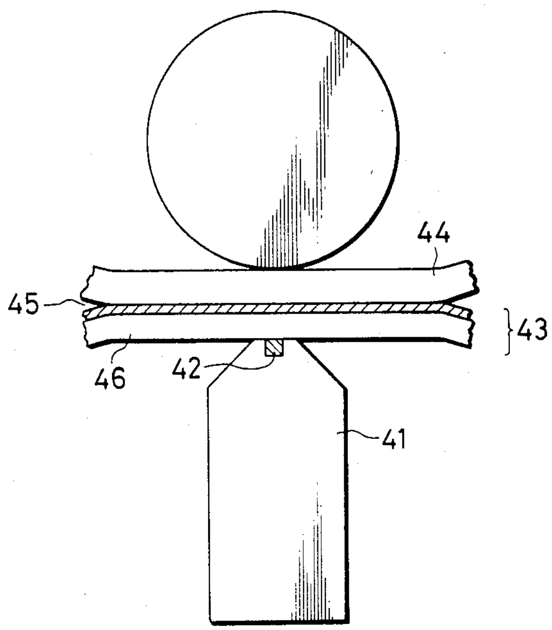
FIG. 8 is a diagram for explaining the printing operation in the fourth embodiment.

In a fourth embodiment, the respective base layers of thermal-transfer media are made different in thickness. As shown in FIG. 8, where printing is performed by a thermal-transfer recording system, thermal pulses generated from heat elements 42 of a thermal head 41 are applied onto a thermal transfer medium 43, thus transferring ink onto printing paper 44. If energy for printing by a thermal pulse is constant, a thinner base layer 46 results in a higher temperature at the ink layer 45, because the ink layer 45 receives heat from the base layer 46. As described with respect to FIG. 6, the adhesion is increased in connection with the viscosity. Accordingly, in this fourth embodiment, the thickness of the base layer decreases for each of the four thermal transfer media $43_1$ through $43_4$ to be used successively in printing in the order shown in Table 3.

TABLE 3

| Thermal-transfer Recording Media | Thickness of Base Layer (μm) |
|---|---|
| $43_1$ | 9 |
| $43_2$ | 6 |
| $43_3$ | 4.5 |
| $43_4$ | 3 |

The melting point of the ink of each of the thermal transfer media $43_1$ through $43_3$ is 69° C.

In order to gradually make the temperature of thermal-transfer ink in transfer operations higher, the applied energy may be increased without changing the respective thicknesses of the base layer or the ink layer of the thermal-transfer medium. If the applied energy is made stronger, the melted quantity of ink per dot is increased correspondingly so as to deteriorate the resolution. Where the thickness of the base layer is gradually lessened as in this embodiment, the diffusion of heat in the base layer lessens so that it becomes possible to increase the temperature without increasing the melted quantity of ink.

In a fifth embodiment, base layers are made of diffeent materials. In this embodiment, the same effect as that shown in FIG. 4 can be obtained by utilizing base layers of different thermal characteristics. Materials different in heat conductivity or specific heat are used for the respective base layers. In the case of a printing device using, for example, two kinds of thermal-transfer recording media, a condenser paper having a viscosity of 0.7 g/cm$^3$ and a thickness of 9 μm is used as the base layer of a first thermal-transfer recording medium, while polyester having the same thickness of 9 μm is used as the base layer of a second thermal-transfer medium. Similarly, condenser papers different in density may be used for the respective thermal-transfer recording media.

Figure 9:
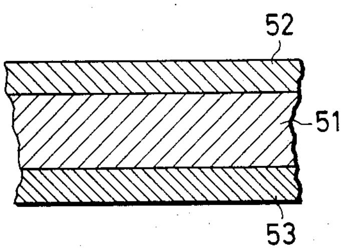
FIG. 9 is a cross-sectional view for explaining a modified example of the base layer.
Figure 10:
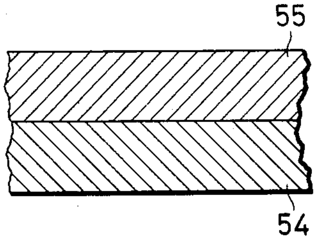
FIG. 10 is a cross-sectional view for explaining a modified example of the ink layer.

For the sake of simplicity, the above description has been made such that a single ink layer is formed on a single base layer. However, as to the foregoing embodiments and the principle of the present invention, other layer constitutions may be included within the scope of the present invention. For example, a base layer may be arranged such that a polyester base layer 51 is sandwiched between an upper and a lower layer 52 and 53 as shown in FIG. 9. In this case, the upper layer 52 may be, for example, a mat processed layer or an ink-removing facilitating layer and the lower layer 53, adapted to be in contact with a thermal head, may be a heat-resist processed layer. Another layer constitution is depicted in FIG. 10 in which the ink layer may be constituted by two layers, one being a coloring material layer 54 to be in contact with the base layer and the other being a wax layer 55 formed on the former. Alternatively, the ink layer may be arranged such that coloring material particles in a capsulated state are dispersed in a wax layer.

Figure 11:
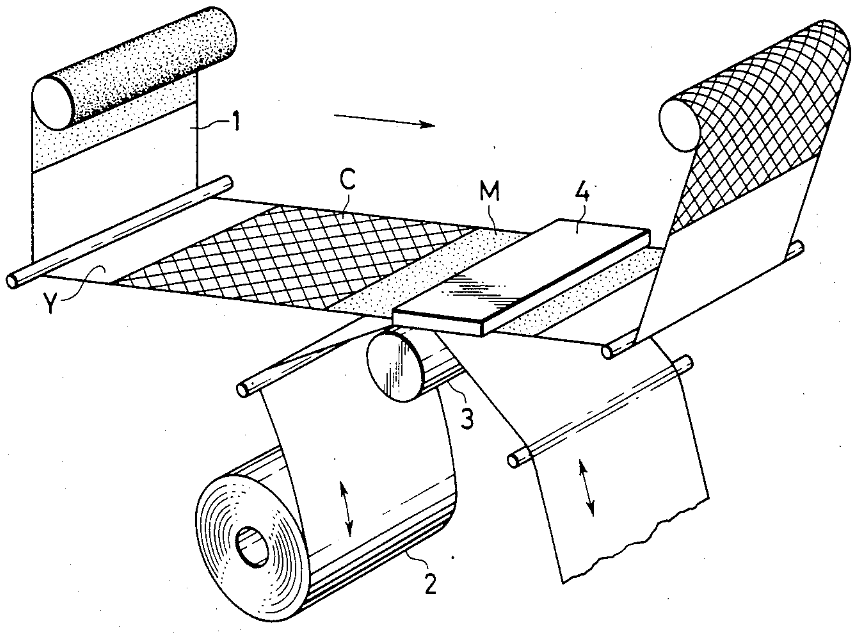
FIGS. 11 and 12 are perspective views showing two kinds of printing devices into which the present invention can be applied.
Figure 12:
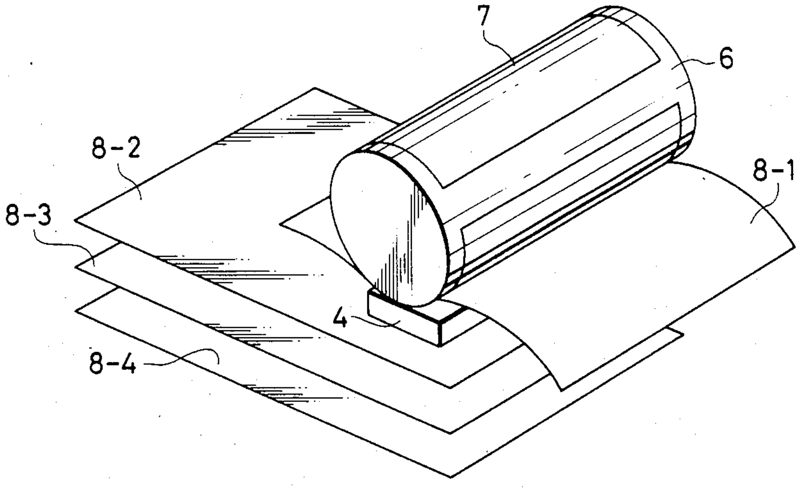

Moreover, the printing device into which the present invention is applied is not limited only to that shown in FIG. 3, but those devices shown in FIGS. 11 and 12, and other printing devices, not described herein, may be utilized for the same purpose.

Thus, according to the present invention, in a printing device in which a plurality of thermal-transfer media are used successively, the thermal-transfer media may be made different in thermal characteristic so that good printing can be performed even where ink is superimposed on other ink. Thus, high quality printing can be performed stably.

What is claimed is:

1. A method for printing using at least two thermal transfer inks which are different from each other in color or printing density comprising the steps of:

preparing a thermal-transfer recording media for each of the thermal-transfer inks, each of said media comprising a base layer and a respective ink layer, one of said media being different in thermal characteristic from the other of said media; and repeating printing operations by successively using said thermal-transfer recording media one after the other on the same printing paper.

2. The printing method according to claim 1 in which said one thermal-transfer recording media is made different in its thermal characteristic by selecting the thickness of the respective ink layer to be different from that of the other of said media.

3. The printing method according to claim 1 in which said one thermal-transfer recording media is made different in its thermal characteristics by selecting the melting point of the respective ink layer to be different from that of the other of said media.

4. The printing method according to claim 1 in which said one thermal-transfer recording media is made different in its thermal characteristic by selecting the thickness of the respective base layer to be different from that of the other of said media.

5. The printing method according to claim 1 in which said one thermal-transfer recording media is made different in its thermal characteristic by selecting the respective base layer material to be different in thermal conductance from that of the other of said media.

6. The printing method according to claim 1 in which said one thermal-transfer recording media is made different in its thermal characteristic by selecting the density of the respective base layer to be different from that of the other of said media.

7. The printing method according to claim 1 in which said one thermal-transfer recording media is made different in its thermal characteristic by selecting the viscosity versus temperature characteristic of the respective ink layer to be different from that of the other of said media.

* * * * *